Patented June 20, 1950

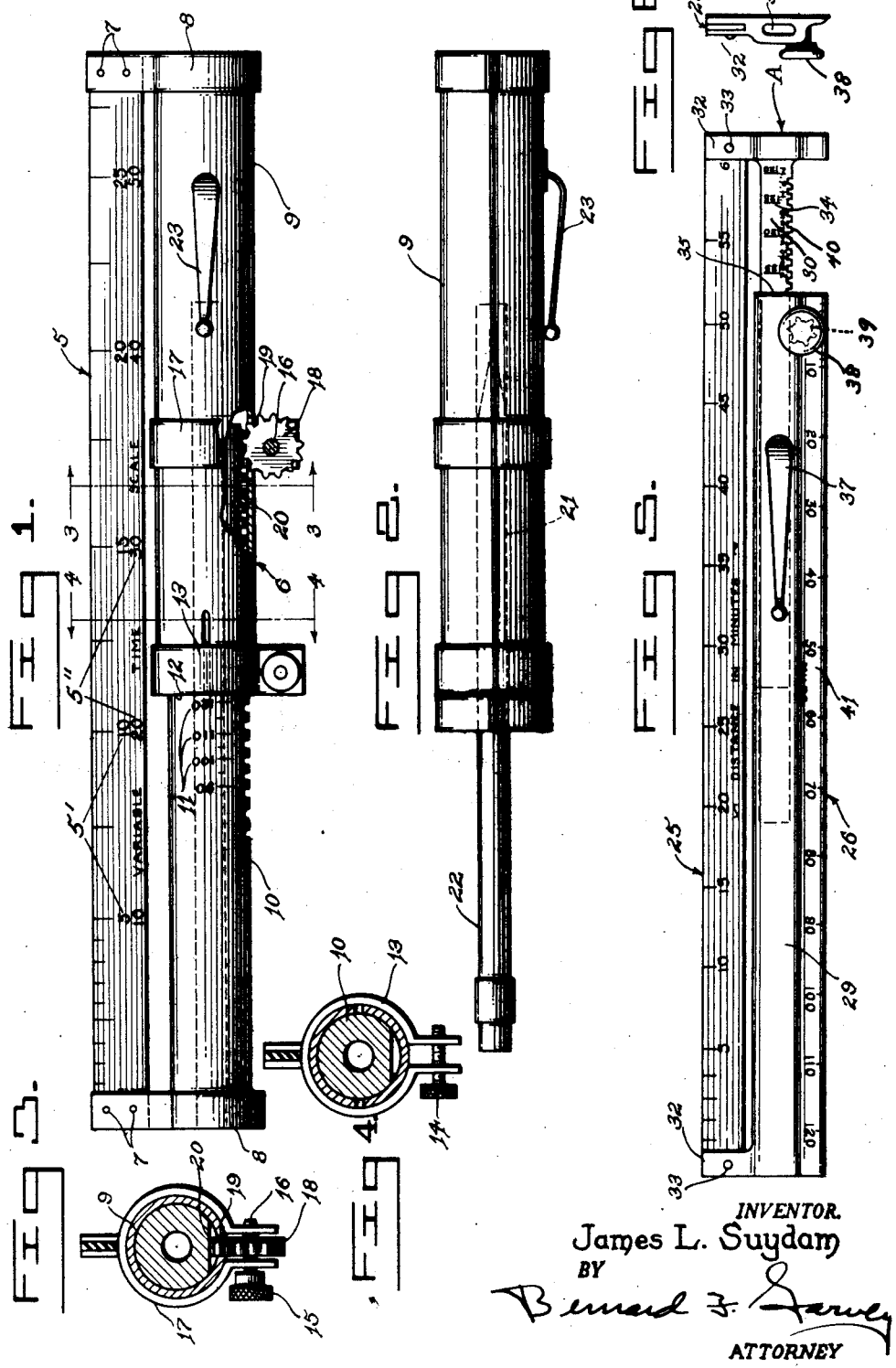

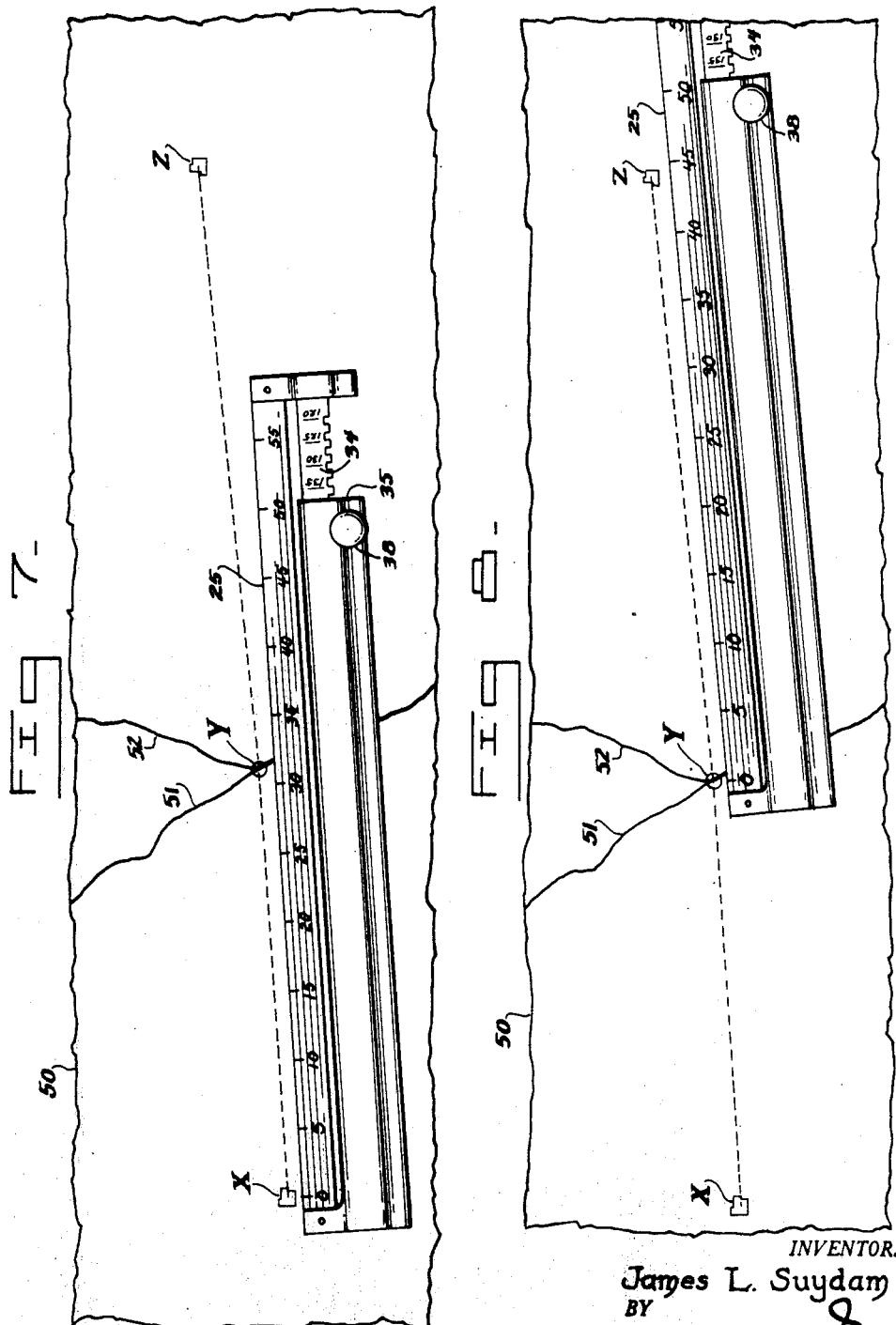

2,512,184

UNITED STATES PATENT OFFICE 2,512,184

AERIAL NAVIGATION COMPUTER

James L. Suydam, Cincinnati, Ohio

Application November 26, 1946, Serial No. 712,299

1 Claim. (Cl. 235—61)

This invention relates to a computing instrument designed especially, although not exclusively, for use in aerial navigation, and in conjunction with a suitable flight map to facilitate determining actual ground speed and the prospective time of arrival at a given objective.

In aerial navigation, the speed which is of major importance is the "ground speed" or actual speed made going over the ground, since this is the measure of progress made towards the destination. This "ground speed" is the algebraic summation of the components in the actual direction of travel, of the air speed and the wind velocity. Consequently, the "ground speed" is affected by changes in air speed of the airplane, which is under the control of the pilot, and by changes in the force or direction of the wind, which is beyond the control of the pilot.

As is well known, a change in the force or in the direction of the wind, or a change in the heading of the airplane will result in a change in the component of the wind velocity along the line of flight, with a consequent corresponding change in the ground speed. Also, since the wind varies in direction and intensity at different altitudes, and is not generally the same for all localities, aircraft navigation is a continuous affair of making slight changes in airplane heading, and in air speed to compensate for the changes in wind force and direction that are encountered.

At the present time, even with the use of instruments, the determination of "ground speed" and prospective time of arrival at a given objective requires the making of numerous calculations taking the time and attention of the pilot. These calculations are required of the pilot at the same time that he is employed in maintaining the aircraft under control. Under such circumstances the pilot is very apt to make errors in the calculations, greatly increasing the possibility of his becoming lost.

An object of the present invention is to provide a simple, easily handled, and direct reading instrument for computing "ground speed" and determining the prospective time of arrival at a given objective without requiring measuring of distances on the flight chart and the calculations now involved in determining these values.

The problem of aerial navigation referred to above is greatly simplified by the use of a computer embodying the present invention for the following reasons:

1. There is no need to have dividers, ruler, or simple computer.

2. There is no measurement of distance on the chart.

3. There are no calculations involved.

4. The navigation computer can be easily operated with one hand.

5. The computer is always set with the latest ground speed and therefore is ready for instant use in determining position or time.

6. The computer is easily read, and can be readily used at night.

7. When not in actual use it can be kept in the pocket where it is handy.

The invention together with its objects and advantages will be best understood by a reading of the following detailed description in reference to the accompanying drawings in which are illustrated preferred embodiments of the invention, and wherein:

Figure 1 is an elevational view of one form of aerial navigation instrument contemplated by this invention;

Figure 2 is a plan view of the instrument of Figure 1, and showing the same in fully retracted position;

Figures 3 and 4 are transverse sectional views taken substantially on the lines 3—3 and 4—4 of Figure 1;

Figure 5 is an elevational view of a second form of aerial navigational instrument embodying the features of the present invention; and Figure 6 is an end elevational view thereof looking in the direction of the arrow A.

Figures 7 and 8 are plan views illustrating the use of the instrument with a map to determine ground speed and prospective time of arrival at a destination.

In that form of the invention shown in Figures 1 to 4 inclusive of the drawings, the computer comprises, in general, a variable time scale 5, to the ends of which are secured the ends of telescoping structure 6.

The time scale 5 is in the form of a strip of elastic material, such as rubber, or a coil spring, having suitably delineated thereon a scale graduated in units of time, e. g., minutes. Either graduations 5' or graduations 5'' may be employed, as will be explained. The ends of the strip are secured as at 7—7 between the parallel, co-extensive ends of split bands 8—8 which embrace the free extremities of the telescoping members 9, 10 of the aforementioned structure 6.

The member 9 of structure 6 is in the form of a hollow cylinder within which member 10 has a sliding fit. On the member 10 are marked the graduations 11 indicating units of distance per unit of time, e. g., miles per hour, and arranged to be read against the end edge 12 of member 9 for showing the ground speed.

Embracing the end 12 of member 9 is a split band 13 provided with a bolt 14 whereby the band may be contracted or expanded to increase or relieve frictional contact between the scale members 9 and 10 as retarded or free movement of member 10 with respect to member 9 may be desired.

For projecting and retracting the scale member 10 there is provided a thumb wheel 15 mounted on one end of a stub shaft 16 that is journaled in the apertured ends of a band 17 disposed about an intermediate portion of scale member 9. On the stub shaft 16 is a pinion 18 that works through a slot 19 in the periphery of member 9 and meshes with a rack 20 formed on the periphery of the extension member 10, for imparting movement of wheel 15 to the extension scale member 10 and longitudinal expansion and contraction of the elastic scale strip 5.

The extension member 10 is provided with a longitudinal bore 21 constituting a storage pocket for a writing instrument 22, e. g., a pencil.

The member 9 of structure 6 is also provided with a suitable clip 23 for engaging the pocket of a garment to retain the instrument, when in retracted condition, therein.

In Figures 5 and 6 showing another form of the invention, time scale 25, like time scale 5 of Figure 1, is a strip of elastic material such as rubber, or a coil spring, having delineated thereon a scale graduated in minutes. Also the telescoping structure 26, like telescoping structure 6 of Figure 1, is composed of a pair of telescoping members 29 and 30. However, in this form of the invention, the members 29, 30 are substantially flat and at their respective outer or free ends are provided with slotted extensions 32 to which the ends of the time scale 25 are secured as at 33.

The member 30 of the structure 26 has a working sliding fit within the hollow of the scale member 29, and is provided with speed scale graduations 34 arranged to be read against the end edge 35 of member 29 for indicating the ground speed.

Also, the scale member 30 may be provided with a longitudinal storage pocket for the reception of a suitable writing instrument; and the scale member 29 is provided with a clip 37 corresponding to the clip 23 of the first form of the invention.

For projecting and retracting the scale member 30, and consequently effecting longitudinal expansion and contraction of the elastic scale strip 25, there is suitably mounted on the scale member 29 adjacent the end 35 thereof a thumb wheel 38 on the shaft of which is a pinion 39 that is in mesh with a rack 40 formed on a longitudinal edge of the extension member 30.

This second form of the invention is also characterized by having on that longitudinal edge thereof remote from the scale 25 a distance scale 41 graduated in units of distance, e. g., miles.

The device of this invention is particularly adapted for aerial navigation and may be used to determine the ground speed and the prospective time of arrival at given objective.

The mathematical relationship between the time scale and miles-per-hour scale, and the method of calibrating the scales are as follows: The aerial navigation computer is calibrated for use with maps having a certain miles-per-inch scale. Since the U. S. aerial navigation maps in almost universal use are to the scale of ⅛ inch equals one mile, the computer will usually be designed for use with maps to that scale.

For use on light airplanes having a ground speed ranging from 120 to 240 miles per hour, the computer may be as shown in Figure 5 and have an overall length when collapsed of 15 inches, the 15-inch elastic time scale being divided into 60 minutes, and the end edge 35 indicating a speed of 120 miles per hour on the scale 34. These values fit the formula: speed=miles/hour because 120 miles per hour=120 miles (equivalent to 15 inches on the map) divided by one hour (60 minutes).

To calibrate the 200 miles per hour mark on the scale 34, the scale member 30 is extended until the overall length of the elastic time scale 25 is twenty-five inches. The end edge 35 will then indicate a speed of 200 miles per hour on the scale 34. These values also fit the formula: speed=miles/hour because 200 miles per hour= 200 miles (equivalent to 25 inches on the map) divided by one hour (60 minutes). With two points on the scale 34 determined, all other calibrations can be made by interpolation and extrapolation.

If a computer having a smaller physical size is desired, the overall length when collapsed may be made 7½ inches. In this event the elastic time scale should be calibrated from zero to 30 minutes as at 5″ of Figure 1. Substituting into the formula speed=miles/hour, 120 miles per hour= 60 miles (7½ inches on the map) divided by ½ hour (30 minutes).

If it is desired to use aerial navigation maps having different scales of miles per inch, the computer may be designed with different corresponding time scales 5′ and 5″ as shown in Figure 1.

It is obvious from the foregoing that computers may be designed to meet any desired requirements as to physical size, airplane speed range and map scale.

Figures 7 and 8 are provided to illustrate the use of my invention by way of a practical example. Map 50 shows towns X and Z, and rivers 51 and 52 intersecting at Y. In this example, it is desired to fly from town X to town Z. During the flight, the pilot observes the intersection Y of rivers 51 and 52, or any other recognizable landmark which is on his map. Knowing the time he left town X and the time he is over point Y, he determines the elapsed time it took to fly from X to Y. Assuming it took thirty-one minutes, the pilot lays the aerial navigation computer on the map with the zero indicia of the variable time scale 25 on town X. He then turns thumb wheel 38 until the scale division on variable time scale 25 corresponding to thirty-one minutes, is on point Y. This condition of the computer is shown in Figure 7. The computer is now set so that the ground speed and the prospective time of arrival at town Z can be easily determined without any calculating whatsoever. The ground speed between points X and Y can be read directly from the position of edge 35 on ground speed scale 34. From Figure 7 it can be observed that the ground speed reading is one hundred and thirty eight miles per hour. This speed reading is the average ground speed between points X and Y and is the actual ground speed throughout the flight if the pilot keeps the air speed constant.

To determine the prospective time of arrival at town Z, the computer is merely placed on the map along the line of flight from Y to Z with the zero indicia of variable time scale 25 on point Y as shown in Figure 8. The variable time scale reading opposite town Z is seen to be forty-four in this example. It therefore will take forty-four minutes to go from point Y to town Z if the pilot maintains constant air speed.

It is to be noted that if the pilot is solely interested in the time of arrival at town Z, he can go through the foregoing procedure without paying any attention to the ground speed scale 34.

In Figures 7 and 8, town X, point Y and town Z are not on a straight line. This illustrates the fact that the computer can be used to determine time of arrival even though a change of course is made at an intermediate point Y provided that the amount of change of course is not too great considering the speed and direction of the wind.

The procedure of determining ground speed and prospective time of arrival at various points can, of course, be gone through as many times during a flight as desired.

From the foregoing, the manner of using the device and its many advantages should be apparent to those skilled in the art without further detailed discussion.

While I have herein described what I believe to be preferred embodiments of my invention, nevertheless it is to be understood that various changes may be made therein, within the scope of the appended claim.

What I claim is:

A computer instrument comprising a pair of telescoping members one of which is provided with a scale adapted to be read against one end of the other of said members as an index, a variable time scale in the form of an elastic strip secured at its opposite ends to the free ends of the telescoping members, a thumb wheel on one of the telescoping members, and a rack and pinion connection between the wheel and the other of the telescoping members for effecting projection and retraction of the latter in response to rotation of the wheel.

JAMES L. SUYDAM.

REFERENCES CITED

The following references are of record in the file of this patent:

UNITED STATES PATENTS

| Number | Name | Date |
|---|---|---|
| 120,621 | Chassaing | Nov. 7, 1871 |
| 2,256,116 | Hughes | Sept. 16, 1941 |